US008705966B2

(12) United States Patent
Zhao et al.

(10) Patent No.: US 8,705,966 B2
(45) Date of Patent: Apr. 22, 2014

(54) METHOD, DEVICE AND SYSTEM FOR MANAGING INFORMATION OF AN OPTICAL NODE IN AN OPTICAL DISTRIBUTION NETWORK

(75) Inventors: Jun Zhao, Shenzhen (CN); De Li, Shenzhen (CN); Haining Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 266 days.

(21) Appl. No.: 13/007,049

(22) Filed: Jan. 14, 2011

(65) Prior Publication Data

US 2011/0110664 A1 May 12, 2011

Related U.S. Application Data

(63) Continuation of application No. PCT/CN2009/071291, filed on Apr. 16, 2009.

(30) Foreign Application Priority Data

Aug. 20, 2008 (CN) .......................... 2008 1 0147542

(51) Int. Cl.
*H04J 14/02* (2006.01)
(52) U.S. Cl.
USPC ............................................. 398/67; 398/25
(58) Field of Classification Search
USPC ................................. 398/66, 25, 67
See application file for complete search history.

(56) References Cited

U.S. PATENT DOCUMENTS

| 6,252,858 | B1 | 6/2001 | Inoue |
| 2006/0015503 | A1 | 1/2006 | Simons et al. |
| 2006/0091207 | A1 | 5/2006 | Chang |
| 2007/0127487 | A1* | 6/2007 | Kim et al. ..................... 370/392 |
| 2007/0274720 | A1 | 11/2007 | Menasco, Jr. et al. |

(Continued)

FOREIGN PATENT DOCUMENTS

| CN | 1723732 A | 1/2006 |
| CN | 1744570 A | 3/2006 |

(Continued)

OTHER PUBLICATIONS

Extended European Search Report in corresponding European Patent Application No. 09807821.5 (Aug. 24, 2012).

(Continued)

*Primary Examiner* — Nathan Curs
(74) *Attorney, Agent, or Firm* — Leydig, Voit & Mayer, Ltd.

(57) ABSTRACT

The present invention discloses a method, device and system for managing information of an optical node in an optical distribution network, relates to management of information of an optical node in an optical distribution network, is capable of solving the problem of manual entry of information of an optical node being cumbersome, and is not limited by installation locations of the optical node. The method for managing information of an optical node in an optical distribution network includes: obtaining an identity code of an optical node; querying a pre-established optical node information table according to the identity code of the optical node, wherein the optical node information table comprises the identity code of the optical node and the installation location information of the optical node. The present invention is suitable for management of information of an optical node in an optical distribution network.

9 Claims, 3 Drawing Sheets

(56) References Cited

U.S. PATENT DOCUMENTS

| | | | |
|---|---|---|---|
| 2008/0279555 A1* | 11/2008 | Horiuchi et al. | 398/71 |
| 2008/0310835 A1* | 12/2008 | Lorentzen et al. | 398/9 |
| 2010/0158527 A1* | 6/2010 | Mizutani et al. | 398/78 |
| 2011/0164882 A1* | 7/2011 | Ye et al. | 398/141 |
| 2011/0170871 A1* | 7/2011 | Kazawa et al. | 398/66 |

FOREIGN PATENT DOCUMENTS

| | | | | |
|---|---|---|---|---|
| CN | 1764117 A | | 4/2006 | |
| CN | 1964236 A | | 5/2007 | |
| CN | 1964283 A | | 5/2007 | |
| EP | 1560364 | * | 8/2005 | H04L 12/24 |
| EP | 1560364 A1 | | 8/2005 | |
| KR | 20010067863 A | | 7/2001 | |

OTHER PUBLICATIONS

International Search Report in corresponding International Patent Application No. PCT/CN2009/071291 (Jul. 23, 2009).

Written Opinion of the International Searching Authority in corresponding International Patent Application No. PCT/CN2009/071291 (Jul. 23, 2009).

"L.64—Series L: Construction Installaction and Protection of Cables and Other Elements of Outside Plant," Feb. 2007, International Telecommunication Union, Geneva, Switzerland.

$2^{nd}$ Office Action in corresponding Chinese Patent Application No. 200810147542.6 (Apr. 18, 2013).

* cited by examiner

METHOD, DEVICE AND SYSTEM FOR MANAGING INFORMATION OF AN OPTICAL NODE IN AN OPTICAL DISTRIBUTION NETWORK

CROSS-REFERENCE TO RELATED APPLICATIONS

This application is a continuation of International Application No. PCT/CN2009/071291, filed on Apr. 16, 2009, which claims priority to Chinese Patent Application No. 200810147542.6, filed on Aug. 20, 2008, both of which are hereby incorporated by reference in their entireties.

FIELD OF THE INVENTION

The present invention relates to the field of communications, and in particular to a method, device, and system for managing information of an optical node in an optical distribution network.

BACKGROUND OF THE INVENTION

An Optical Distribution Network (ODN) is an optical distribution network composed of fiber optical distributors in a Passive Optical Network (PON). It enables the fiber optical transmission bandwidth of a PON interface to be shared by multiple Optical Network Units (ONUs) through the optical dividers on the nodes. As shown in FIG. 1, an ODN can be divided into sections such as optical fiber feeder section, optical fiber distribution section, and optical fiber home section, according to its structure. An Optical Line Terminal (OLT) is the core of the system. An Optical Network Terminal (ONT) or an Optical Network Unit (ONU) is disposed on the user side and used for terminating an optical fiber link. An OLT connects to an ONT (or an ONU) through an ODN. An ODN includes nodes of feeder lines and distribution lines such as user access points and optical fiber distribution points, and optical cable terminal boxes at the optical fiber home sections. With the steady and continuous development of optical access technologies such as PON, the number of the nodes in the ODN gradually increases. As an ultimate user optical fiber interface equipment, optical cable terminal boxes will be used in a large scale in the optical distribution networks.

At present, the way of managing the optical cable terminal boxes is mainly to manually record their serial numbers and installation states, and then manually register such information into the data management unit in the optical distribution network management center. This process consumes time, is prone to error and therefore has the disadvantage of high maintenance costs.

SUMMARY OF THE INVENTION

The embodiments of the present invention provides a method, device, and system for managing information of an optical node in an optical distribution network, which are capable of achieving automatic management of information of an optical node in an optical distribution network and are not limited by the installation locations of the optical node.

To solve the preceding technical problems, the embodiments of the present invention adopt the following technical solutions.

A method for managing information of an optical node in an optical distribution network. The method includes:
obtaining an identity code of an optical node; and
querying a pre-established optical node information table according to the identity code of the optical node and obtaining installation location information of the optical node to achieve the management of the optical node, wherein the optical node information table includes: identity code of the optical node and the installation location information of the optical node.

The present invention also provides a device for managing information of an optical node in an optical distribution network. The device includes:
a first read module, configured to read an identity code of an optical node and send the identity code to an association module;
a second read module, configured to read installation location information of the optical node and send the installation location information to the association module;
the association module, configured to associate the identity code of the optical node with the installation location information of the optical node and generate optical node association information; and
a communication interface unit, configured to send the optical node association information generated by the association module to a data management unit in the optical distribution network center.

The present invention further provides a system for managing information of optical node in an optical distribution network. The system includes:
an optical node information management device, configured to associate an identity code of an optical node with installation location information of the optical node to generate optical node association information by obtaining the identity code of the optical node and the installation location information of the optical node, and report the optical node association information to a data management unit in the optical distribution network management center;
a communication interface unit, configured to receive the optical node association information sent from the optical node information management device and convert the optical node association information into data in a data format identifiable to the data management unit; and
the data management unit, configured to store and manage the optical node association information in the form of database table.

In the method, device, and system for managing information of an optical node in an optical distribution network, provided by the present invention, the device for managing information of an optical node reads the identity code and installation location information of the optical node and associate them to generate optical node association information, and a communication interface unit sends the optical node association information to a data management unit in the optical distribution network. In the data management unit in the optical node information management system, installation location information of the optical node is obtained by querying a pre-established optical node information table according to the identity code of the optical node, to achieve unified and automatic management of the optical node, without the limitation of the installation location of the optical node. This saves time and human resources, thus reducing the operation costs of the operators and facilitating management and maintenance.

DETAILED DESCRIPTION OF THE EMBODIMENTS

The present invention provides a method, device, and system for managing information of an optical node in an optical distribution network, which are capable of achieving automatic management of the information of the optical node in the optical distribution network, thereby solving the problem that currently adopted manual entry of optical node information is time-consuming and cumbersome, and is prone to errors.

In the embodiments of the present invention, the optical distribution network is an optical distribution network composed of passive optical fiber connectors, an optical node is a node connecting an optical line terminal to an optical network unit (or optical network terminal), such as optical cable terminal box, Access point (AP), feeder node, and distribution node.

In the following, a method, device and system for managing information of an optical node in an optical distribution network according to the embodiments of the present invention are described in detail with reference to the accompanying drawings. It should be understood that the following embodiments are used for illustrating the present invention only and not for limiting the protection scope of the present invention.

Figure 1:
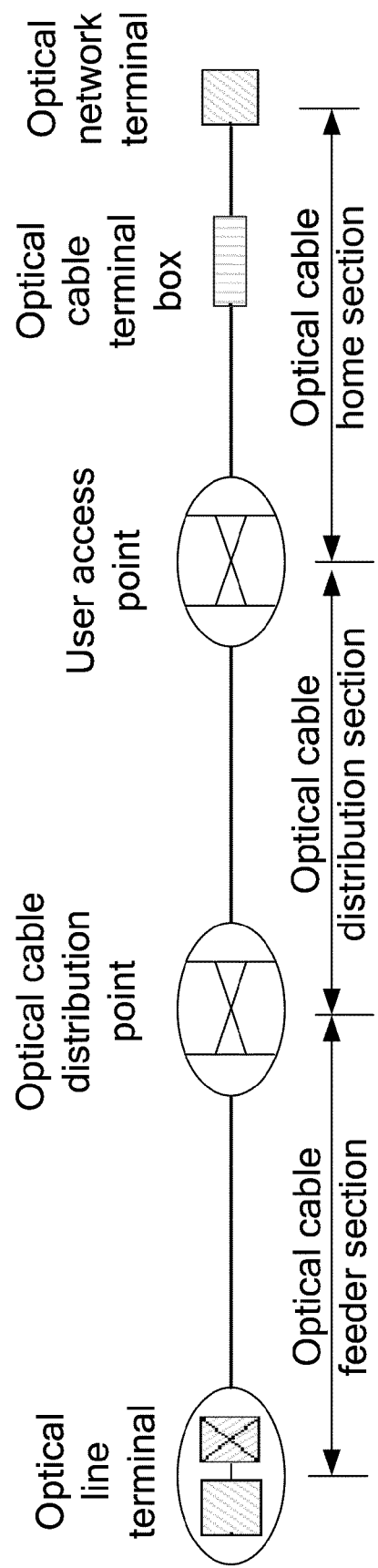
FIG. 1 is a schematic diagram of structure of an optical distribution network of the conventional art.
Figure 2:
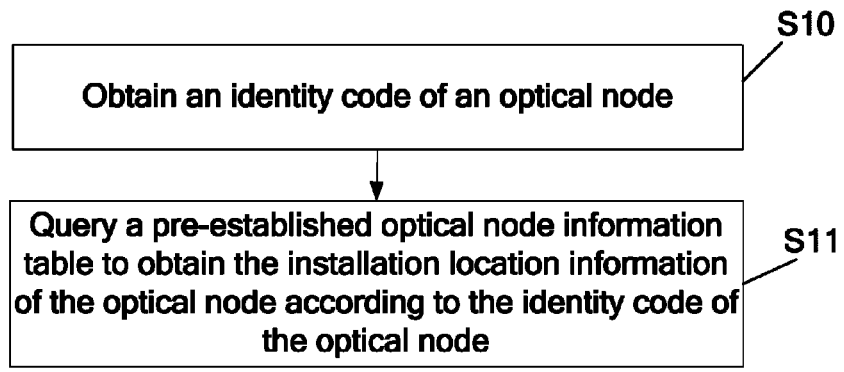
FIG. 2 is a flow chart of a method for managing information of an optical node in an optical distribution network according to an embodiment of the present invention.

As shown in FIG. 2, the method of the present invention for managing information of an optical node in an optical distribution network comprises the following steps:

S10: Obtain an identity code of an optical node.

S11: Query a pre-established optical node information table according to the identity code of the optical node, and obtain installation location information of the optical node, wherein the optical node information table includes the identity code of the optical node and installation location information of the optical node, so as to achieve a unified management of the optical node.

In the following, an optical cable terminal box in the optical distribution network is taken as an example for illustrating in detail the method of the invention for managing information of an optical node in an optical distribution network.

Embodiment 1

S10: Obtain an identity code of an optical cable terminal box.

S11: Query a pre-established optical cable terminal box information table according to the identity code of the optical cable terminal box, and obtain installation location information of the optical cable terminal box, the geographical name of the installation location, and identification of the optical network terminal connected with the optical cable terminal box.

For example, when the optical cable terminal box is in a not-installed state, an optical cable terminal box information record can be found querying a pre-established optical cable terminal box information table according to the identity code 12345 of the optical cable terminal box. The record indicates that the installation state of the optical cable terminal box with an identity code 12345 is Idle (which means it is not installed at any location).

TABLE 1

| Identity code | Installation state | Installation location | Optical network terminal serial no. |
|---|---|---|---|
| 12345 | Idle | NULL (blank) | NULL (blank) |

When the optical cable terminal box is in an initially installed state, an optical cable terminal box information record can be found querying the pre-established optical cable terminal box information table according to the identity code 12345 of the optical cable terminal box. This record indicates that the longitude and latitude of the installation location of the optical cable terminal box with an identity code 12345 are respectively E120 and N23, and its installation state is Standby (which means it is not connected to any optical network terminal equipment).

TABLE 2

| Identity code | Installation state | Installation location | Optical network terminal serial no. |
|---|---|---|---|
| 12345 | Standby | {E120, N23} | NULL (blank) |

When the optical cable terminal box is in an installed state and connected to an optical network terminal, an optical cable terminal box information record can be found querying the pre-established optical cable terminal box information table according to the identity code 12345 of the optical cable terminal box. This record indicates that the longitude and latitude of the installation location of the optical cable terminal box with an identity code 12345 are respectively E120 and N23, and its installation state is Connected (connected to an optical network terminal equipment with a serial number 23456789013).

TABLE 3

| Identity code | Installation state | Installation location | Optical network terminal serial no. |
|---|---|---|---|
| 12345 | Standby | {E120, N23} | 23456789013 |

The method of the present invention for managing information of an optical node in an optical distribution network queries a pre-established optical node information table according to the identity code of the optical node and obtains the installation location information of the optical cable terminal box, geographical name of the installation location, and identification information of the optical network terminal connected to the optical cable terminal box, to achieve unified and automatic management of the optical cable terminal box and is not limited by the installation location. This saves time and human resources, thus reducing the operation costs of the operators and facilitating management and maintenance.

Figure 3:
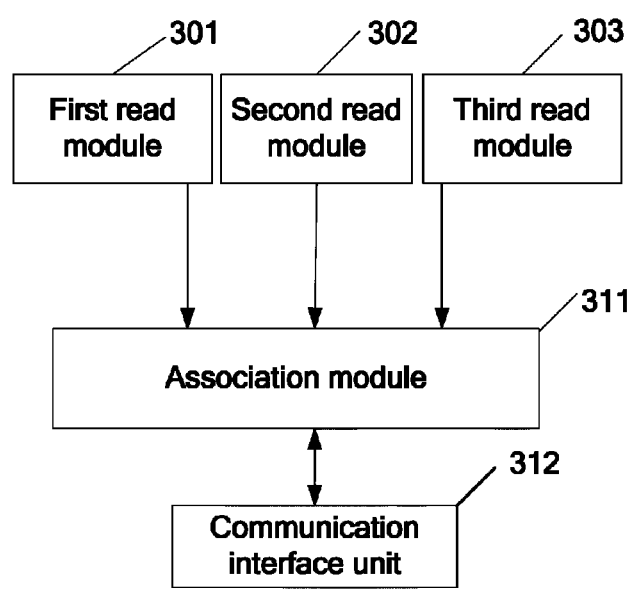
FIG. 3 is a schematic diagram of a device for managing information of an optical node according to an embodiment of the present invention.

As shown in FIG. 3, the present invention also provides a device for managing information of an optical node in a distribution network, comprising:

a first read module 301, configured to read an identity code of an optical node and send the identity code to an association module;

a second read module 302, configured to read installation location information of the optical node and send the installation location information to the association module;

the association module 311, configured to associate the identity code of the optical node with the installation location information of the optical node to generate optical node association information; and a communication interface unit 312, configured to send the optical node association information to a data management unit in the optical distribution network.

In the following, an optical cable terminal box in the optical distribution network will be taken as an example to describe in detail the device for managing information of the optical node in the optical distribution network.

Embodiment 2

A device for managing information of an optical cable terminal box according to an embodiment of the present invention comprises the following components:

A first read module 301 is configured to read the identity code of the optical cable terminal box and send the identity code to an association module 311, wherein the encoding for the identity code of the optical cable terminal box can be Quick Response (QR) code, Han Xin code, or Radio Frequency Identification (RFID) code, etc.

A second read module 302 is configured to read the installation location information of the optical cable terminal box and send the installation location information to the association module 311, wherein the location information read module 302 adopts a Global Positioning System (GPS) device.

When the optical cable terminal box is in a not-installed state, the installation location information obtained is blank or automatically ignored. When the optical cable terminal box is in an initially installed state, the installation location information obtained is longitude and latitude of the installation location of the optical cable terminal box, or its longitude, latitude, and height.

A third read module 303 is configured to read the serial number of the optical network unit connected to the optical cable terminal box and send the serial number to the association module 311 for association.

When the optical cable terminal box is in a not-installed state or an initially installed state, the identification information of the optical network terminal obtained is blank or automatically ignored. When the optical cable terminal box is in an installed state and connected to an optical network terminal, the identification information of the optical network terminal obtained is the serial number of the optical network terminal.

An association module 311 is configured to associate the identity code of the optical cable terminal box with the installation location information of the optical cable terminal box to generate optical cable terminal box association information.

When the optical cable terminal box is not installed, the structure of the association information of the optical cable terminal box is {12345, Idle}. This indicates that the optical cable terminal box with an identity code 12345 is not installed at any location. When the optical cable terminal box is initially installed, the structure of the association information of the optical cable terminal box is {12345, Standby, {E120, N23}}. This indicates that the optical cable terminal box with an identity code 12345 is installed at a location with a longitude and a latitude being {E120, N23} respectively and has not been connected to any optical network terminal equipment. When the optical cable terminal box is installed, the structure of the association information of the optical cable terminal box is {12345, Connected, {E120, N23}, 23456789013}. This indicates that the optical cable terminal box with an identity code 12345 has been installed at a location with a longitude and a latitude being {E120, N23} respectively and has been connected to an optical network terminal equipment with a serial number 23456789013.

A communication interface unit 312 is configured to send the association information of the optical cable terminal box to a data management unit in the optical distribution network. The data management unit can be an operation support system database in the optical distribution network management center.

In the embodiment of the present invention, after the first read module 301 reads the identity code of the optical cable terminal box, the second read module 302 reads the installation location information of the optical cable terminal box, and the third read module 303 reads the identification information of the optical network terminal connected to the optical cable terminal box, the association module 311 associates the identity code of the optical cable terminal box, the installation location information of the optical cable terminal box, and the identification information of the optical network terminal connected to the optical cable terminal box with each other to generate association information of the optical cable terminal box, and sends the association information of the optical cable terminal box to the data management unit through the communication interface unit 312. The embodiment of the present invention achieves automatic read and association of the information of the optical cable terminal box, is not limited by installation location of the optical cable terminal box, prevents the problem that manual entry and management of information of the optical cable terminal box are time-consuming and cumbersome, and is not prone to errors.

Figure 4:
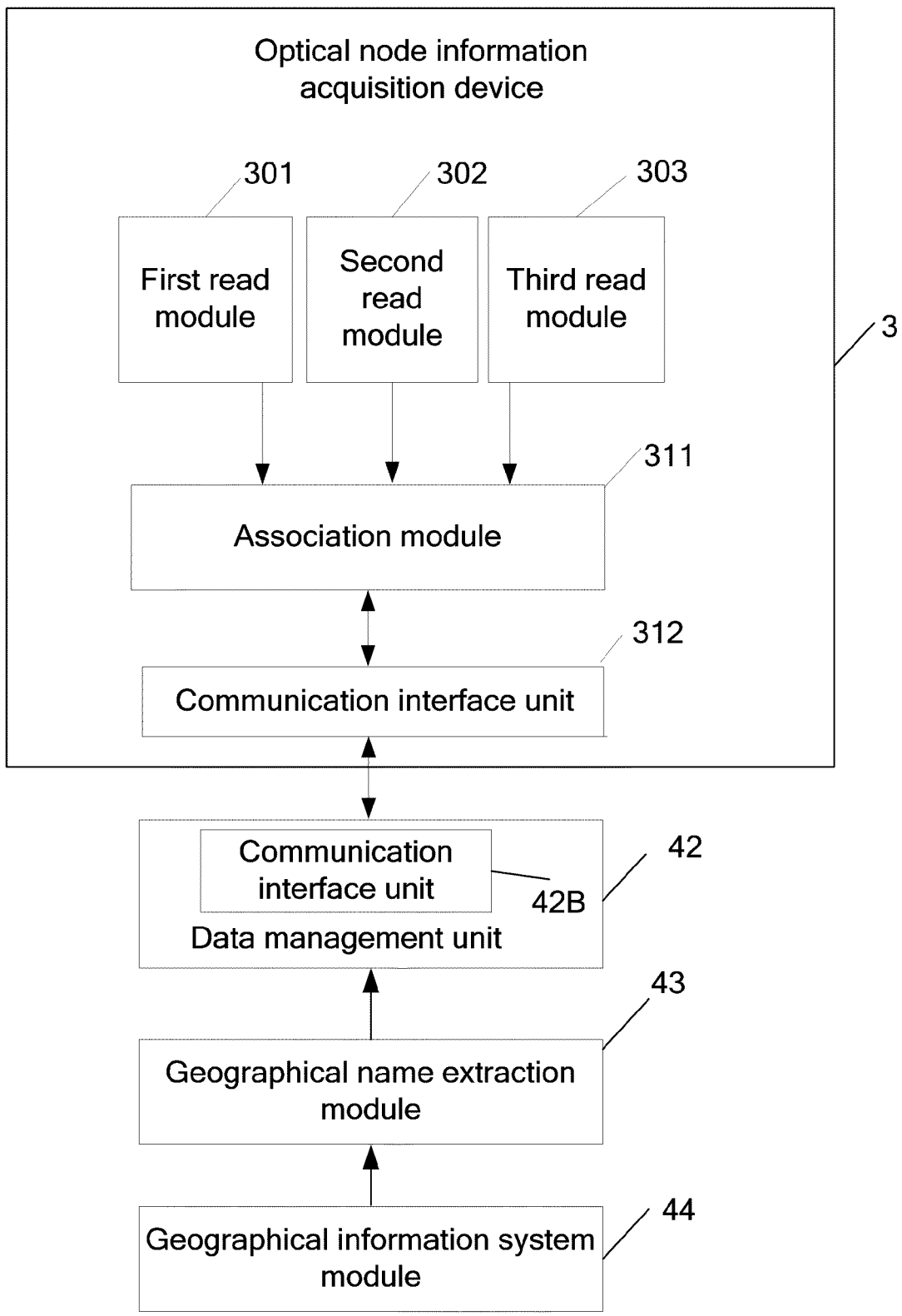
FIG. 4 is a schematic diagram of a system for managing information of an optical node according to an embodiment of the present invention.

As shown in FIG. 4, the present invention also provides a system for managing information of an optical node in an optical distribution network, the system comprises:

an optical node information management device 3, configured to associate an identity code of an optical node with the installation location information of the optical node by obtaining the identity code and the installation location information, to generate optical node association information, and report the optical node association information to a data management unit in the optical distribution network management center;

a communication interface unit 42B, configured to receive the optical node association information sent from the optical node information management device 3, and convert the optical node association information into a data format identifiable to the data management unit; and the data management unit 42, configured to store and manage the optical node association information in the form of database table.

In the following, an optical cable terminal box in the optical distribution network will be taken as an example for describing in detail a system for managing information of an optical node in the optical distribution network according to the embodiment of the present invention.

Embodiment 3

A system for managing information of an optical cable terminal box according to an embodiment of the present invention comprises the following:

An optical node information management device 3 is configured to associate the identity code of the optical cable terminal box with the installation location information of the optical cable terminal box to generate association information of the optical cable terminal box by obtaining the identity code and the installation location information, and report the association information to a data management unit 42 in the optical distribution network management center.

A communication interface unit 42B is configured to receive optical node association information sent from the optical node information management device 3, and convert the association information into a data format identifiable to the data management unit 42, wherein: converting of the optical node association information into a data format identifiable to the data management unit 42 is converting the association information into data in a predetermined format, and the data in the predetermined format can be data in the form of a vector or other forms of data. The data in the form of a vector is shown in Tables 4, 5, and 6.

TABLE 4

| Attribute | Attribute value |
| --- | --- |
| Identity code | {12345} |
| Installation state | Idle |

Table 4 indicates that the optical cable terminal box with an identity code {12345} is in an Idle state, that is, not installed at any location.

TABLE 5

| Attribute | Attribute value |
| --- | --- |
| Identity code | {12345} |
| Installation state | Standby |
| Installation location | {E120, N23} |

Table 5 indicates that the optical cable terminal box with an identity code {12345} is installed at a location with a longitude and a latitude being {E120,N23} respectively, but is not connected to any optical network terminal equipment.

TABLE 6

| Attribute | Attribute value |
| --- | --- |
| Identity code | {12345} |
| Installation state | Connected |
| Installation location | {E120, N23} |
| Serial no. of optical network terminal | {23456789013} |

Table 6 indicates that the optical cable terminal box with an identity code {12345} is installed at a location with a longitude and a latitude being {E120,N23} respectively, and is connected to an optical network terminal with serial No. {23456789013}.

The data management unit 42 is configured to store in the form of database table and managing the optical node association information. The database table can be a data table of a relational database or a data table of other types of database.

As shown in FIG. 4, in an exemplary embodiment of the present invention, an information management system of optical cable terminal boxes further comprises a geographical name extraction module 43 for extracting the geographical name of the optical cable terminal box and sending it to the data management unit 42. The geographical name extraction module 43 extracts the geographical name of the terminal box, such as xx tower, xx road, and xx district, in a geographical information system module 44 according to the installation location information of the terminal box represented with a longitude and a latitude or with a longitude, a latitude, and a height. The extraction module 43 extracts the geographical name and sends the geographical name to the data management unit 42. If the geographical information system 44 does not support height information, the height information will be automatically matched with the longitudes and the latitudes to obtain the geographical name of the installation location.

The system of the embodiment of the present invention for managing information of an optical node reads discretely located identity code of the optical cable terminal box, the installation location information of the terminal box, and the identification information of the optical network terminal connected to the terminal box, associates them with each other to generate optical cable terminal box association information, and sends the association information to the data management unit 42 through the communication interface unit 42B. The data management unit 42 manages and maintains the association information, and combines the longitude and latitude of the terminal box with the geographical name of the installation location of the terminal box through the geographical name extraction module 43, thereby more completely determining the installation location of the terminal box. The embodiment achieves an automatic management of the information of the optical cable terminal boxes and is not limited by the installation locations of the terminal boxes. This prevents the problem that manual entry and management of optical cable terminal box information are time-consuming and cumbersome, and is not prone to errors.

From the preceding description of the embodiments, it is obvious to a person skilled in the art that the present invention can be carried out by means of software plus necessary hardware platform, or can be carried out with hardware only. Based on such an understanding, the part of the technical solution of the present invention that makes contribution to the background art can be entirely or partly embodied as a software product. Such a computer software product can be stored in a storage medium, such as ROM/RAM, magnetic disk, and optical disk. The software product comprises several instructions to enable a computer device, such as a personal computer, a server, and a network device to perform the methods of the embodiments or parts of the embodiments of the present invention.

The foregoing are only some specific embodiments of the present invention. However, the protection scope of the present invention is not limited thereby. Within the extent of the present disclosure, any variations or replacements easily conceivable to a person skilled in the art should be deemed as being covered by the protection scope of the present invention. Therefore, the breadth of the present invention is defined by the claims.

The invention claimed is:

1. A method, performed by a data management unit having a processor, for managing optical node information in an optical distribution network, the method comprising:
obtaining an identity code of an optical node, wherein the optical node is an optical node connecting an optical line terminal (OLT) to an optical network unit (ONU); and
querying a pre-established optical node information table, wherein the pre-established optical node information table comprises the identity code of the optical node, installation location information of the optical node, and identification information of the ONU connected to the optical node; and
achieving management of the optical node by obtaining the installation location information of the optical node according to the identity code of the optical node, wherein the installation location information and the identification information are both related to the identity code.

2. The method for managing optical node information in an optical distribution network according to claim 1, wherein the installation location information of the optical node comprises a geographical name of an installation location of the optical node.

3. The method for managing optical node information in an optical distribution network according to claim 1, wherein the optical node is an optical cable terminal box or other optical node in the optical distribution network.

4. A device for managing optical node information in an optical distribution network, the device comprising:
- a first read module, configured to read an identity code of an optical node and send the identity code to an association module, wherein the optical node is an optical node connecting an optical line terminal (OLT) to an optical network unit (ONU);
- a second read module, configured to read installation location information of the optical node and send the installation location information to the association module;
- a third read module configured to read identification information of the ONU connected to the optical node and to send the identification information of the ONU to the association module for association;
- the association module, configured to associate the received identity code of the optical node with the installation location information of the optical node and the identification information of the ONU to generate optical node association information; and
- a communication interface unit, configured to send the optical node association information generated by the association module to a data management unit in an optical distribution network center.

5. The device for managing optical node information in an optical distribution network according to claim 4, wherein the optical node is an optical cable terminal box or other optical node in the optical distribution network.

6. The device for managing optical node information in an optical distribution network according to claim 4, wherein the first read module is a card reader; and the second read module is a network device with a Global Positioning System (GPS) function.

7. A system for managing optical node information in an optical distribution network, the system comprising:
- an optical node information management device configured to associate an identity code of an optical node with installation location information of the optical node and identification information of an optical network unit (ONU) connected to the optical node to generate optical node association information by obtaining the identity code of the optical node, the installation location information of the optical node, and the identification information of the ONU connected to the optical node, and report the association information to a data management unit in an optical distribution network management center;
- a communication interface unit, configured to receive the association information sent from the optical node information management device and convert the association information into data identifiable to the data management unit; and
- the data management unit, configured to store and manage the association information in the form of a database table.

8. The system for managing optical node information in an optical distribution network according to claim 7, further comprising:
- a geographical name extraction module, configured to extract a geographical name of a location corresponding to the node and to send the geographical name of the location corresponding to the node to the data management unit.

9. The system for managing optical node information in an optical distribution network according to claim 7, wherein the optical node is an optical cable terminal box or other optical node in the optical distribution network.

* * * * *